C. COLAHAN.
TRACTOR ENGINE.
APPLICATION FILED OCT. 4, 1917.

1,297,104.

Patented Mar. 11, 1919.
2 SHEETS—SHEET 1.

Inventor
C. Colahan.
by
Attorney

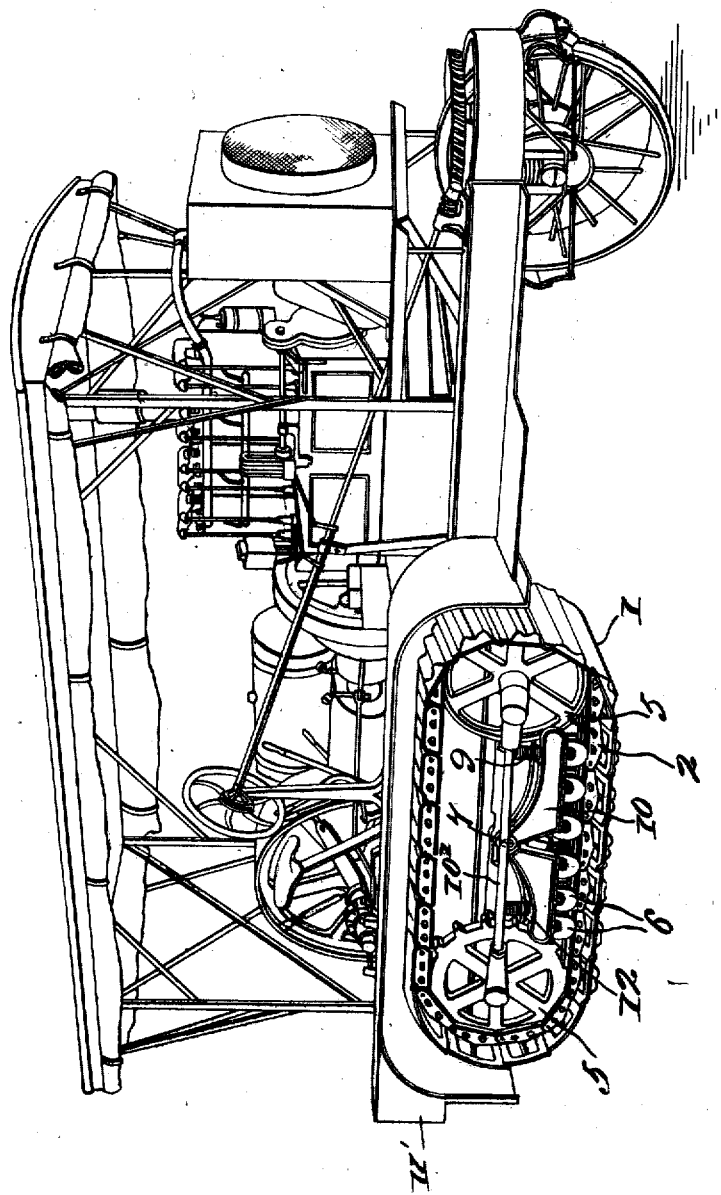

UNITED STATES PATENT OFFICE.

CHARLES COLAHAN, OF STOCKTON, CALIFORNIA.

TRACTOR-ENGINE.

1,297,104.    Specification of Letters Patent.    Patented Mar. 11, 1919.

Application filed October 4, 1917. Serial No. 194,788.

*To all whom it may concern:*

Be it known that I, CHARLES COLAHAN, a citizen of the United States, residing at Stockton, in the county of San Joaquin and State of California, have invented certain new and useful Improvements in Tractor-Engines; and I do hereby declare the following to be a full, clear, and exact description of the invention, such as will enable others skilled in the art to which it appertains to make and use the same.

My invention relates to improvements in tractor engines or vehicles, and relates particularly to tractor engines of the so-called "caterpillar" type in which the power of the engine is transmitted to an endless apron or belt, upon the ground, this belt being supported by a series of spools, rollers or truck wheels so that the tractive effort or pull of the engine is distributed over a comparatively long extent, thereby securing better grip on the surface of the ground, at the same time avoiding the vexation and trouble caused by the sinking and slipping of the wheels when wheels are used. Engines of this type are sometimes said to employ a self-laying traction member. My invention relates particularly to improvements in such member, and I provide a device in which such members are free to yield vertically in their travel, and conform substantially to the contour of the ground over which they pass, maintaining a uniform traction power and utilizing the traction members more perfectly than has heretofore been done in machines of this class.

All parts coöperate in these vertical movements, utilizing the traction members, and securing the desired flexibility, which is important to machines of this class.

My invention relates to mechanism of this character, having two independent parallel self-laying tracks, one on each side of the machine, and my invention relates especially to the manner of construction and operation of these flexible, vertical side carrying and supporting frames that carry the running gear and chain tread of the tractor.

Figure 1:
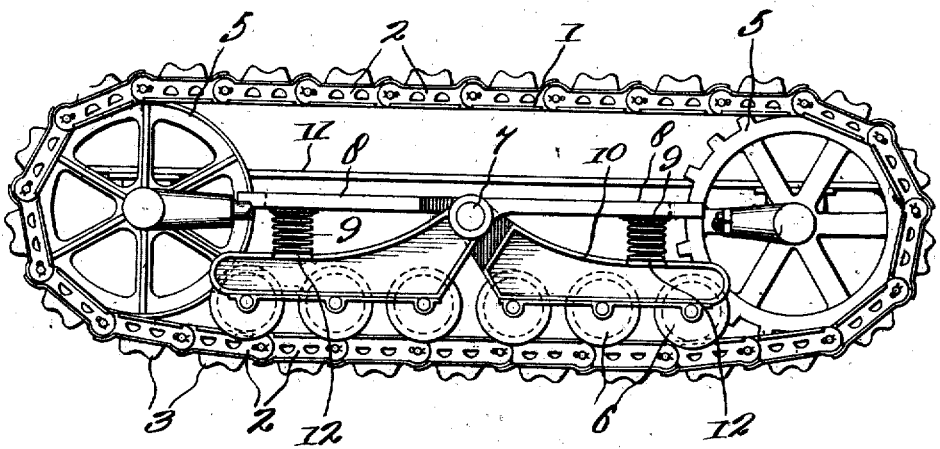
Figure 2:
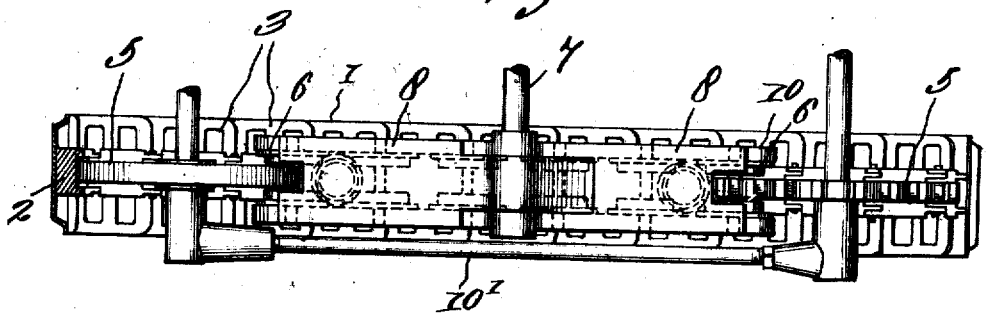
Figure 3:
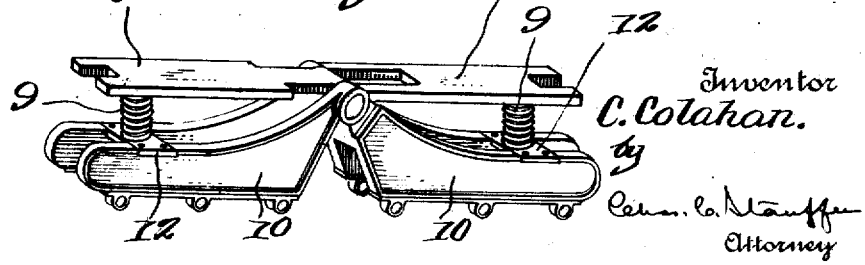

With the above and other objects in view, my invention has particular relation to the novel features of construction described in the specification, and shown in the accompanying drawings, wherein Figure 1 is a side elevation of my improvement. Fig. 2 is a plan view showing, with the apron mainly removed, the flexible vertical side carrying and supporting frame. Fig. 3 is a detail of my pivoted frames, and Fig. 4 is a perspective view showing my device attached to a tractor engine.

I employ a track apron 1 provided with shoes 2 of usual type with lugs or grousers 3, if desired. The apron is carried over drive sprockets 5 usually free from the ground, and I provide between said sprockets, on each side or wherever an apron is used, truck rollers 6. Said rollers carry the load and transmit it to the track or apron. There are six of these rollers in my construction, between each pair of sprocket wheels, and these six rollers are in two groups of three each, as shown, and are carried in pivoted frames 10.

These frames are pivotally secured on axles 7 projecting horizontally from the side of the main frame 11' of the tractor, and are each provided with arms 8, each extending transversely across the pivotal point or supporting axle back over and parallel substantially to the truck-carrying part of the other frame. Each arm is yieldingly supported on springs 9 located on the top of its opposite or companion frame. thus forming a perfectly flexible X-shaped support, with an equally coöperating yielding function that more evenly distributes the load and thus obviates the friction or dead load prevalent at this point in other forms of construction. One of the frames is forked as seen in Fig. 3, and at the pivot point straddles the other. Any pressure on one frame is transmitted through the springs directly to its companion frame. I provide a replaceable section 12, whereby the frames may be brought together.

It will be noted that I have devised flexible yielding supports for my rollers whereby any desired amount of flexibility is secured and the belt or apron, or track as it is sometimes called, may conform readily to the shape or contour of the ground and at the same time the springs 9 enable each group of rollers to yield to any inequality or obstruction under the track, at the same time yieldingly transmitting its lift due to such obstruction to the rollers on its mating or correlated frame. The two frames constitute in effect one support tilting about the axle 7 with the additional provision of the yielding or spring elements 9 keeping the members yieldingly apart and whereby the frames not only tilt but yield and in each case each frame 10 transmits to its corresponding companion frame the pressure due to yielding, so that each takes up part of the load when the other is subjected to excessive load or pressure. The frames are of the same size by preference and by preference they have the same number of rollers and extent of bearing surface whereby uniformity of action is secured. The reverse is the case too, so that if either frame tends to sink into a depression, the companion frame and its rollers simply get a little more load and compensate for any variation, thus tending to keep the device on an even keel. In fact, since there are two of said aprons or tractor belts, one on each side and two frames to each belt, the four frames behave somewhat like the legs and feet of an animal walking over rough ground. If one foot rests upon, say, a hummock, it yields a little and the weight is distributed to the other foot on the same side (or end) and in fact to the other three feet and the animal, especially if it be one like, say a deer, whose motions are well coördinated, moves evenly along without trouble or annoyance. In a sense my springs behave like the muscles and joints of such an animal and my frame, in a way, like its limbs. The joint about the axle 7, is, in a sense, a knee joint and the movement controlled by the spring somewhat like a hip joint.

I provide adjustable thrust rods 10' for keeping the track at proper tension. My rollers are each mounted upon a suitable axis 11 in its pivoted frame. None of the weight is borne by the sprockets. It will be noted that I have devised a compensating support for the trucks or frames of a tractor engine whereby flexibility and ease of yield are important to the traction members of a truck, and ability to conform to inequalities of surface without much jar or strain. Jerking of the frames over an obstruction is largely controlled and eliminated too by the stretched traction belt.

What I claim as new and desire to secure by Letters Patent of the United States is:—

1. In a traction engine, in combination, a traction belt, sprockets over which said belt is carried and by which it is driven, rollers, a pair of frames on which said rollers are mounted, a common pivot for said frames, and springs between said frames, whereby when one frame yields to an obstruction, the effect is transmitted to and compensated for by the companion frame and the rollers thereon.

2. In a traction engine, in combination, a traction belt, sprockets over which said belt is carried and by which it is driven, rollers, a pair of frames on which said rollers are mounted, a common pivot for said frames, an extension on each of said frames and a spring between each of said extensions and the other frame, whereby when one frame yields to an obstruction, the effect is transmitted to and compensated for by the companion frame and the rollers thereon.

3. In a traction engine, in combination, a traction belt, sprockets over which said belt is carried and by which it is driven, rollers between said sprockets, said rollers being divided into groups of even number, frames of equal size in which said rollers are mounted, one group for each frame, a pivot on which said frames are mounted, and yielding connections between said frames, whereby when one frame yields to an obstruction the companion frame takes up part of the loss in compensation.

4. In a traction engine, in combination, a traction belt, sprockets over which said belt is carried and by which it is driven, rollers, a pair of frames on which said rollers are mounted, a common pivot for said frames, an arm on each of said frames extending back over and parallel to the roller carrying part of the other frame, and a yielding connection between each frame and the roller carrying part of the other frame, whereby when one frame yields to an obstruction, the effect is transmitted to and compensated for by the companion frame and the rollers thereon.

5. In a traction engine, in combination, a traction belt, sprockets over which said belt is carried, frames within said belt, a shaft on the main frame, on which said frames are pivoted, an extension arm on each of said frames, yielding means between each said arm and the other frame, and truck wheels in each said frame.

6. In a traction engine, in combination, a traction belt, wheels for driving said belt, a flexible X-shaped support within said belt, weight supporting means on the members of said flexible X-shaped support, and means whereby said members are kept apart or distended.

7. In a tractor, in combination, a traction belt, means for carrying and driving said belt, a flexible X-shaped support of two members within said belt, an axle projecting from the main frame on which said support is pivoted, and springs between said members on either side of said axle.

8. In a tractor, in combination, a traction belt, means for carrying and driving said belt, rollers within said belt, pivoted frames carrying said rollers, and yielding connections directly between said frames, whereby when one frame is made to pass over an obstruction the effect of its lift is transmitted to the other frame.

In testimony whereof I affix my signature.

CHAS. COLAHAN.

Witnesses:
M. H. COLAHAN,
L. HUGHES.